(12) United States Patent
Fukunaka et al.

(10) Patent No.: US 8,007,650 B2
(45) Date of Patent: Aug. 30, 2011

(54) APPARATUS FOR MANUFACTURING METAL NANOTUBE AND PROCESS FOR MANUFACTURING METAL NANOTUBE

(75) Inventors: Yasuhiro Fukunaka, Kyoto (JP); Yoko Konishi, Kyoto (JP); Munekazu Motoyama, Kyoto (JP); Ryuji Ishii, Kyoto (JP)

(73) Assignee: Yasuhiro Fukunaka, Kyoto (JP)

( * ) Notice: Subject to any disclaimer, the term of this patent is extended or adjusted under 35 U.S.C. 154(b) by 1057 days.

(21) Appl. No.: 10/576,937

(22) PCT Filed: Oct. 13, 2004

(86) PCT No.: PCT/JP2004/015066
§ 371 (c)(1),
(2), (4) Date: May 7, 2007

(87) PCT Pub. No.: WO2005/040460
PCT Pub. Date: May 6, 2005

(65) Prior Publication Data
US 2007/0284257 A1 Dec. 13, 2007

(30) Foreign Application Priority Data
Oct. 24, 2003 (JP) ................................. 2003-365120

(51) Int. Cl.
*C25D 5/02* (2006.01)
(52) U.S. Cl. ....................................................... 205/131
(58) Field of Classification Search .................. 205/124, 205/131, 173
See application file for complete search history.

(56) References Cited

U.S. PATENT DOCUMENTS
2003/0001274 A1  1/2003 Den et al.

FOREIGN PATENT DOCUMENTS
| JP | 11-200090 | 7/1999 |
| JP | 2003-25298 | 1/2003 |
| JP | 2004-118124 | 4/2004 |

OTHER PUBLICATIONS

Brumlik et al. ("Template Synthesis of Metal Microtubule Ensembles Utilizing Chemical, Electrochemical, and Vacuum Deposition Techniques," Accession No. ADA274676, published by Defense Technical Information Center, Jan. 11, 1994).*

(Continued)

*Primary Examiner* — Luan V Van
(74) *Attorney, Agent, or Firm* — Antonelli, Terry, Stout & Kraus, LLP.

(57) ABSTRACT

Disclosed is a low-cost, high quality metal nanotube comprising Ni, Fe, Co or the like. A metal thin film having a thickness of 10 to 80 nm is formed as a cathode on one surface of a film having penetrated holes, and an electrolyte solution is filled between an anode and the cathode to which a voltage is applied. Metal ions in the electrolyte solution are electrochemically deposited on the walls of the penetrated holes, thereby forming metal nanotubes. A thermoplastic resin porous film such as a polycarbonate film, an alumina porous film or aluminum anodic oxide film may be used as the film, and the diameters of the penetrated holes are preferably 15 to 500 nm. The metal thin film can be formed by sputtering, and preferably comprises a platinum-palladium alloy. The electrochemical processing of nanostructured tailored materials is a unique technique.

5 Claims, 5 Drawing Sheets

OTHER PUBLICATIONS

Peng et al. ("Bismuth quantum-wires arrays fabricated by electrodeposition in nanoporous anodic aluminum oxide and its structural properties," Materials Science and Engineering B, vol. 77, Issue 3, Sep. 29, 2000, pp. 246-249).*

Tourillon et al. ("ChemInform Abstract: Electrochemically Synthesized Co and Fe Nanowires and Nanotubes," Elec.*

Martin ("Membrane-based Synthesis of Nanomaterials," Chem mater. 1996, 8, 1739-1746).*

Bao ("Template Synthesis of an Array of Nickel Nanotubules and Its Magnetic Behavior," Adv. Mater., 2001, 13 No. 21, Nov. 2, 2001) teach a similar process.*

International Search Report; PCT/JP2004/015066; Date of Mailing: Feb. 1, 2005.

* cited by examiner

100

100

APPARATUS FOR MANUFACTURING METAL NANOTUBE AND PROCESS FOR MANUFACTURING METAL NANOTUBE

RELATED APPLICATION

This application is a U.S. national phase application filed under 35 U.S.C. §371 of International Application No. PCT/JP2004/01566 filed Oct. 13, 2004, and claiming priority of Japanese Patent Application No. 2003-365120 filed Oct. 24, 2003.

TECHNICAL FIELD

The present invention relates to a nanotube, particularly to a nanotube comprising metal. Moreover, the present invention relates to an apparatus for manufacturing a nanotube comprising metal and a process for manufacturing the same.

BACKGROUND ART

A fine substance having a size in the order of nanometer, such as a nanotube, a fullerene, a nanowire and a nanosheet has a novel property which cannot be expressed in a bulk state, and its application has been expected in a variety of fields.

For example, concerning with a carbon nanotube, its application to a flat display panel or the like has been progressed as an excellent electron discharging material and its application to a fuel electric cell or the like as a storage source of hydrogen has also been studied as well. Moreover, a carbon nanotube has also been expected as a wiring material that can realize a superfine wiring which is difficult to be performed by a conventional process of processing a wiring.

A nanowire made of metal (hereinafter, referred to as a metal nanowire) has also been expected to be applied as a wiring material in the same manner as a carbon nanotube, and it has also been considered to be applied to a magnetic memory medium or a magnetic memory element and to be utilized as a catalyst as well. However, regarding a metal nanowire whose aspect ratio (ratio of the length with respect to the diameter=the length/the diameter) is small, there have been many reports of manufacturing examples at a laboratory level, however, manufacturing a metal nanotube with a high aspect ratio, whose utilization value is larger, is difficult.

As a process for manufacturing a metal nanotube whose aspect ratio is large, electrolytic deposition using a template has been disclosed, for example, in G. Tourillon et al., "Electrochemically Synthesized Co and Fe Nanowires and Nanotubes" (Electrochemical and Solid-State Letters, The Electrochemical Society, Inc., January 2000, Vol. 3, No. 1, p. 20 to 23, hereinafter, referred to as G. Tourillon et al.). In the process of G. Tourillon et al., a polycarbonate film with a thickness of 6 μm which has a large number of penetrated holes having a diameter of 30 nm is utilized as a template, a layer composed of Au is formed on the surface of this polycarbonate film as a cathode by a classical vapor deposition process, the space between the cathode and the anode is filled with an electrolyte solution comprising 0.1M $CoSO_4$ or $FeSO_4$ and 0.1M $H_3BO_3$, and a periodic functional voltage consisting of the two stages of a rectangular wave at −1.5 V for 0.3 to 0.5 second as the first stage and a rectangular wave at −0.9 V for 2 seconds as the second stage is serially applied. Co or Fe is precipitated on the wall surface of the penetrated hole of the polycarbonate film and a nanowire comprising Co or Fe can be obtained. Moreover, it has been reported that the operation, wherein a periodic waveform was continued to be applied for 8 minutes in which a pulse voltage at −1.5 V for 0.1 second was applied at the first stage after the waveform was changed and then the current was cut off for 2 seconds at the second stage, was carried out, and as a result, a nanotube comprising Co was formed. In G. Tourillon et al., the mechanism of forming a nanotube is considered such that a metal nanotube is formed by the first stage mechanism of capturing metal ions to the wall surface of the carbonate film due to a complex of carbonate ($CO_3^{2-}$ group) of the carbonate film and metal ions ($Fe^{2+}$ and $Co^{2+}$) in the electrolyte solution to be formed and by the subsequent second stage mechanism of reducing reaction of metal ions. In the case where the electrocrystallization continuation time exceeds over 20 to 22 minutes, the inner side of the tube is embedded with metal clusters to form a nanowire.

Moreover, since the layer made of Au which is to be an electrode is formed on the bottom surface of the polycarbonate film by a classical vapor deposition process, it is estimated that the thickness of the metal layer is not less than 200 nm, as well as the thin film is considerably ununiform, and therefore it is extremely highly possible that the surface of the polycarbonate film is not uniformly covered by the coating of Au. In G. Tourillon et al., it has been described that the metal layer formed by an electrolysis grows in the direction towards the inner side from the wall surface of a nanotube and a cluster is generated in the inner side of a nanotube. Then, since a process for forming a metal layer trace by trace utilizing a pulse voltage is employed, in order to obtain Co and Fe tubes whose wall thickness is only 1 to 2 nm, it requires 15 minutes when the metal ion capturing stage and the metal ion reducing stage are totaled.

Moreover, an example of manufacturing a nanowire and a nanotube composed of Ni has been disclosed in Jianchun Bao et al., "Template Synthesis of an Array of Nickel Nanotubules and Its Magnetic Behavior" (Advanced Materials, WILEY-VCH Verlag GmbH, November 2000, Vol. 13, No. 21, p. 1631 to 1633, hereinafter referred to as Jianchun Bao et al.). In Jianchun Bao et al., a porous film composed of alumina is used as a template, after this alumina porous film has been treated with an organic amine, an electrocrystallization is performed at a current density of 0.3 mA/cm² for 24 hours, and a Ni nanotube having a diameter of 160 nm, a length of 20 μm and a wall thickness of 30 nm was obtained. Moreover, an electrocrystallization was performed for 48 hours under the same conditions, and Ni nanotube having a diameter of 160 nm, a length of 35 μm and a wall thickness of 60 nm was obtained.

However, in Jianchun Bao et al., in order to obtain a nanotube having a length of 20 μm, it required 24 hours for electrolysis time, thus being inefficient.

An object of the present invention is to provide an apparatus with which a high quality metal nanotube can be manufactured in a short time and a process for manufacturing the same.

DISCLOSURE OF INVENTION

The present invention relates to an apparatus for manufacturing a metal nanotube comprising a cathode and an anode which are opposingly disposed, a film having a penetrated hole provided on the cathode, and an electrolyte solution for filling the space between the cathode and the anode, wherein metal is precipitated on the wall surface of the penetrated hole, and wherein the cathode is a thin metal film having a thickness of 10 to 80 nm.

It is preferable that the cathode comprises gold, silver, a gold based alloy, a copper based alloy or a platinum-palladium alloy.

It is preferable that the cathode is a thin metal film obtained by a non-equilibrium electrochemical processing of nano-structurally tailored materials.

It is preferable that the anode comprises nickel, cobalt, iron or an alloy thereof.

It is preferable that the diameter of the penetrated hole is 15 to 500 nm.

In the case where the cathode and the anode are in a flat plate shape and the cathode is horizontally disposed at a upper position and the anode is horizontally disposed at a lower position with respect to gravity, comparatively preferred results are obtained.

Moreover, the present invention relates to a process for manufacturing a metal nanotube comprising:

a step of providing a thin metal film having a thickness of 10 to 80 nm on one surface of a film having a penetrated hole;

a step of filling an electrolyte solution containing metal ions between the cathode having said thin metal film and an anode and applying a voltage to electrolyze said electrolyte solution, thereby electrochemically precipitating metal on the wall surface of the penetrated hole; and a step of immersing the film on which the metal is precipitated in a solvent to remove said film having a penetrated hole, thereby obtaining a metal nanotube.

It is preferable that the thin metal film comprises gold, copper, a gold based alloy, a copper based alloy or a platinum-palladium alloy.

The shape of the metal nanotube can be controlled by adjusting at least one condition selected from the pH of the electrolyte solution and the applied voltage in the electrolysis as well as by controlling a thin film material for a cathode and its fine structure.

It is preferable that the pH of the electrolyte solution containing metal is 0 to 5.5 and the applied voltage in the electrolysis is −0.5 to −1.5 V.

BEST MODE FOR CARRYING OUT THE INVENTION

Concerning with the apparatus for manufacturing a metal nanotube and the process for manufacturing a metal nanotube of the present invention, one embodiment is illustrated with reference to the appended drawings, however, the present invention is not limited to the following Embodiments.

Figure 1:
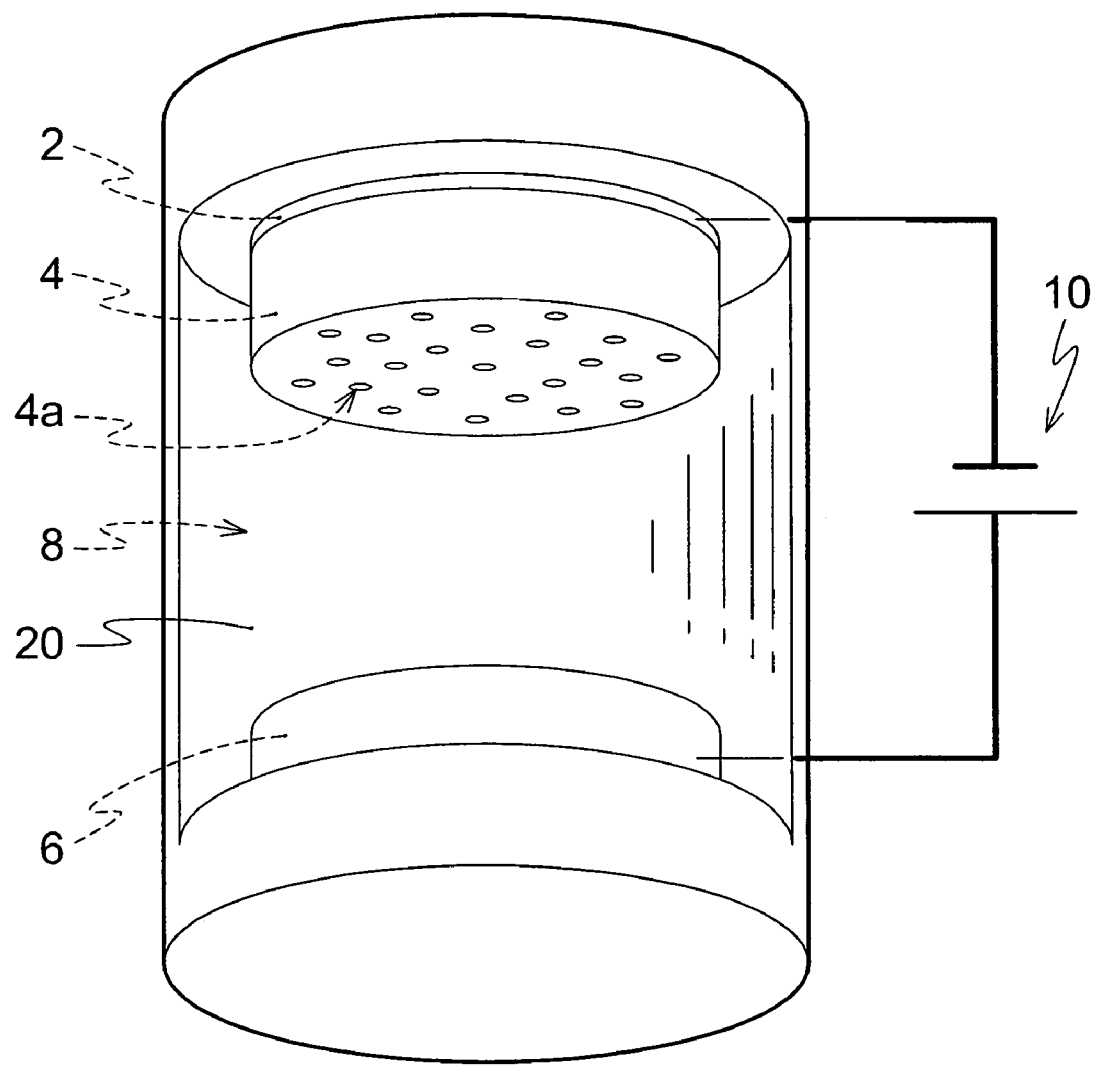
FIG. 1 is a diagram for illustrating the apparatus for manufacturing a metal nanotube and the process for manufacturing a metal nanotube of the present invention.

As shown in FIG. 1, the apparatus for manufacturing a metal nanotube of the present invention comprises a cathode 2 and an anode 6 opposingly disposed, wherein a porous film 4 is provided on the cathode 2. In the porous film 4, a large number of penetrated holes 4a are provided. The cathode 2, the porous film 4 and the anode 6 are contained within a container 20, the space 8 between the cathode 2 and the anode 6 and the penetrated holes 4a of the porous film 4 are filled with an electrolyte solution. In the apparatus for manufacturing a metal nanotube constituted in this way, when the cathode 2 and the anode 6 are connected to a power source 10 and a voltage is applied, metal ions in the electrolyte solution move to the cathode side and are precipitated on the wall surface of the penetrated holes 4a to form a metal nanotube.

It should be noted that in the case where the cathode 2 is a thin film as described later, a conductive plate may be disposed on the rear side of the cathode 2, a conductive film may be formed on the surface of the cathode 2, and so on, as a current collector for applying a voltage.

In the present invention, as the porous film 4, a thermoplastic resin porous film in which a large number of penetrated holes are provided can be utilized. As the thermoplastic resin, for example polycarbonate is exemplified. A polycarbonate film having a large number of uniform penetrated holes can be obtained by irradiating particles having a high energy to strike on a polycarbonate film having no hole and then etching the collision trace, and it is provided, for example, under the trade name of Nuclepore (registered trademark) from Whatman, Co., Ltd. (UK). Moreover, except for a thermoplastic resin porous film, a ceramic based porous film such as an alumina porous film, an aluminum anode oxide film and the like can also be utilized.

In the present invention, since a metal nanotube is formed on the wall surface of the penetrated hole 4a, the shape of the obtained metal nanotube is roughly determined by the diameter and the internal shape of the penetrated hole 4a. Therefore, the diameter of the penetrated hole 4a may be selected in accordance with the diameter of the metal nanotube to be obtained, however, it is preferably 15 to 500 nm, more preferably 50 to 300 nm, and further preferably 100 to 200 nm.

In the present invention, since metal is precipitated nearby the cathode 2 after the initiation of applying an electricity and is growing along the wall surface of the penetrated hole 4a to form a metal nanotube, a metal nanotube having a desired length can be obtained by appropriately adjusting the time for applying an electricity, however, the maximum length of the obtained metal nanotube is approximately equal to the thickness of the porous film 4. Therefore, the thickness of the porous film 4 is required to be approximately equal or more, compared with the length of the metal nanotube to be obtained, however, for example, in the case where a metal nanotube having a diameter of 100 nm is manufactured, the thickness of the porous film 4 is preferably 4 to 8 μm, more preferably 5 to 7 μm, and particularly preferably 5.5 to 6.5 μm. Moreover, in the case where a metal nanotube having a diameter of 200 nm is manufactured, the thickness of the porous film 4 is preferably 8 to 12 μm, more preferably 9 to 11 μm, and particularly preferably 9.5 to 10.5 μm.

In the present invention, the cathode 2 is preferably a thin metal film, and preferably comprises gold, copper, a gold based alloy, a copper based alloy or a platinum-palladium alloy. Among these metals, as described later, from the viewpoint that it is considered that generation of hydrogen gas on the cathode 2 has an influence on growth of a metal nanotube, it is preferable that a metal having hydrogen permeability is used, and it is more preferable that for example, a platinum-palladium alloy which hydrogen tends to excellently permeate. Moreover, the thickness of the cathode 2 is not particularly limited; however, it is preferably 10 to 80 nm, more preferably 20 to 60 nm, and further more preferably 25 to 35 nm. In the case where the thickness of the cathode 2 exceeds over 80 nm, the thin metal film formed on the porous film 4 becomes thicker and the penetrated hole 4a is blocked, and as a result, a high quality metal nanotube may not be manufactured in a short time.

The above-described cathode 2 can be obtained by a non-equilibrium electrochemical processing of nanostructured tailored materials. Herein, a non-equilibrium electrochemical processing of nanostructured tailored materials is referred to a process for forming a film as opposed to a vapor deposition process which is a classical equilibrium method for forming a film. Examples are a sputtering process, an ion beam process, an ion plating process, a chemical vapor deposition (CVD) process, a cluster ion beam process, an optical CVD process and a plasma CVD process. According to these non-equilibrium electrochemical processing of nanostructured tailored materials, a thin metal film having a dense and uniform film thickness can be formed on the porous film 4 by supplying a metal species which is to be a raw material. The uniformity of the formed film thickness is in a range of ±10%, and further it is in a range of ±5%. It becomes possible that a metal tube having a uniform wall thickness is prepared by using such dense and uniform thin metal films as described above.

Figure 2A:
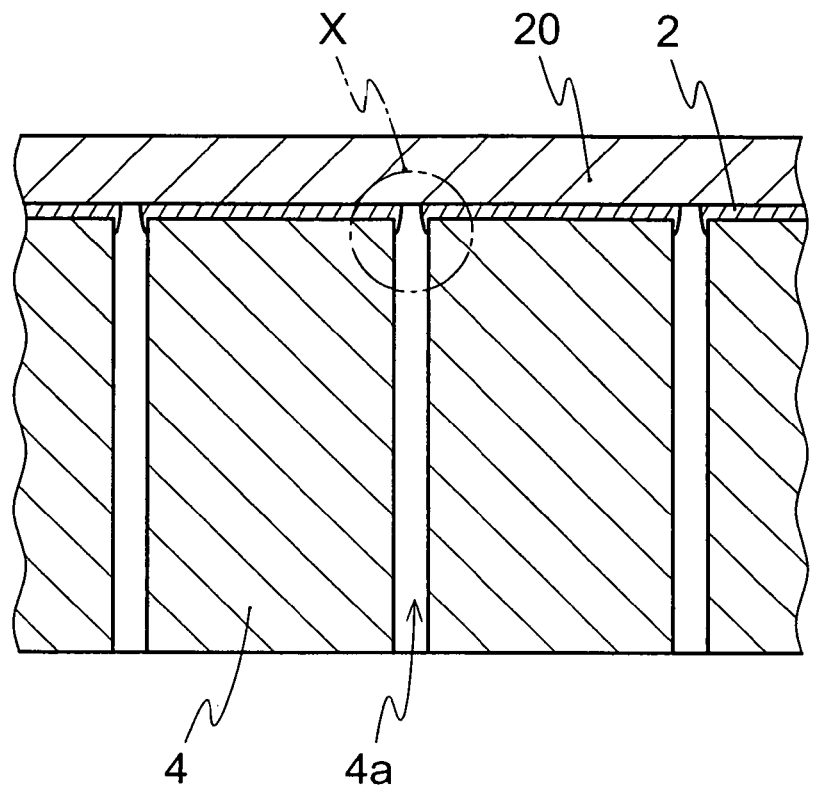
FIG. 2 is a partially enlarged cross sectional view of the penetrated hole and the cathode.
Figure 2B:
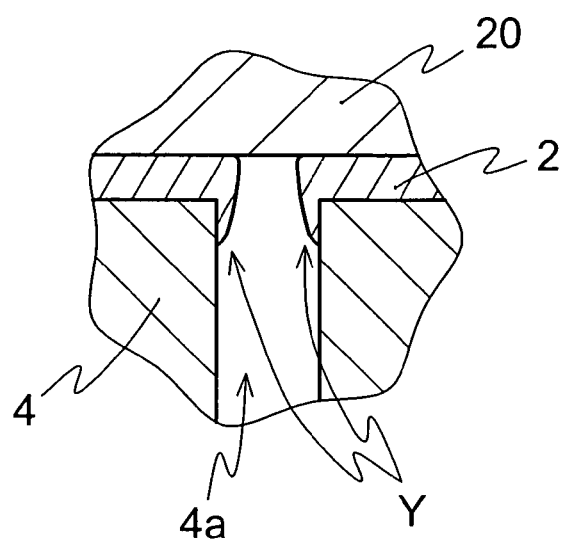

In the case where a thin metal film having a thickness of about 10 to 80 nm is formed on the porous film 4 having the penetrated hole 4a by sputtering, the penetrated hole 4a will not be blocked at all since the thickness of the metal film is thin. Specifically, as shown in the cross sectional view of FIG. 2(a), a pinhole corresponding to the penetrated hole 4a remains in the cathode 2 having a thickness of about 10 to 80 nm formed by sputtering. Since the diameter of this pinhole is smaller than the diameter of the penetrated hole 4a, as shown in FIG. 2(b) which is an enlarged view of X portion of FIG. 2(a), it is considered that the cathode 2 is exposed in a circular shape on the bottom of the penetrated hole 4a and metal is precipitated on the exposed portion Y to form a nanotube satisfactorily.

Figure 3A:
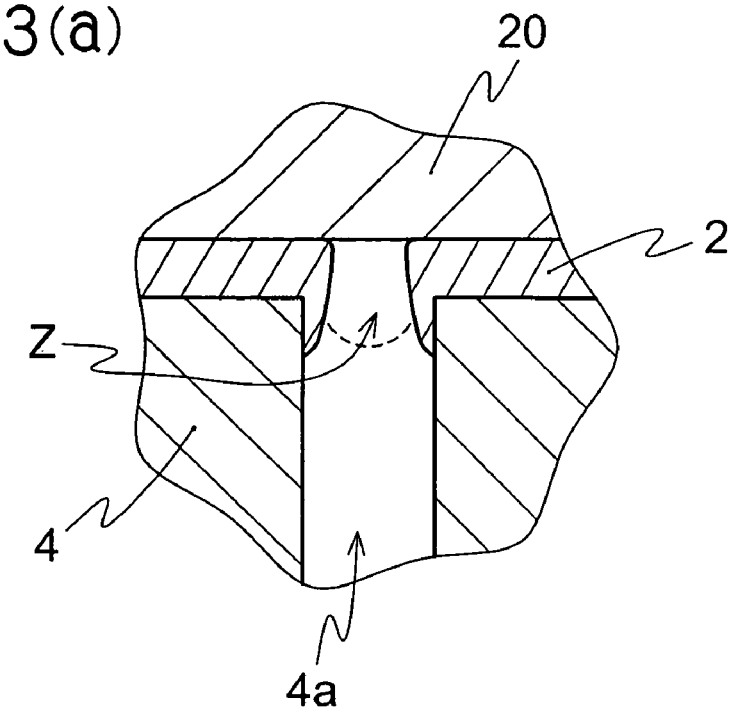
FIG. 3 is a partially enlarged cross sectional view of the penetrated hole and the cathode, which illustrates the relationship between generation of hydrogen gas and growth of a metal nanotube.
Figure 3B:
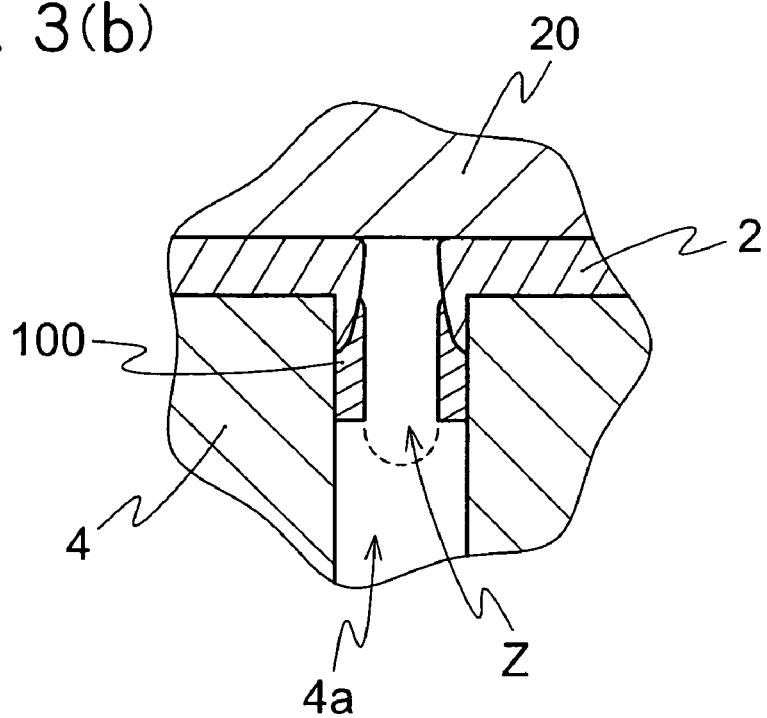

Moreover, as shown in FIG. 3(a), it is considered that since hydrogen ions are reduced to generate hydrogen gas on the cathode 2 by a current and then a highly pressurized bubble portion Z is formed and maintained at and nearby the pinholes due to the generated hydrogen gas, a metal nanotube grows accompanying the elapsed time, as shown in FIG. 3(b).

In the present invention, the anode 6 is not particularly limited and a metal or an alloy can be utilized, however, the anode 6 preferably comprises nickel, cobalt or iron. Or, it is preferable that the anode 6 comprises an alloy comprising two kinds or more of these metals. Moreover, it is preferable that an alloy material having the same composition as the metal nanotube to be obtained is used.

By the way, in FIG. 1, the cathode 2 and the anode 6 in a flat plate shape are oppositely disposed, however, they can be made in other electrode shapes such as a spherical-flat plate and a concentric tube. However, as described above, since it is considered that hydrogen gas bubbles play an important role on forming a nanotube within the penetrated hole 4a, it is comparatively preferable that the cathode 2 and the anode 6 in a flat plate shape are horizontally disposed so that the cathode 2 is located at an upper position and the anode 6 is located at a lower position with respect to gravity.

In the present invention, as the electrolyte solution containing metal ions for filling between the anode 6 and the cathode 2 having the thin metal film, for example, an aqueous solution containing $NiSO_4 \cdot 7H_2O$, $NiCl_2 \cdot 6H_2O$ and $H_3BO_3$ can be used, and for example, a nanotube made of Ni can be obtained by utilizing an aqueous solution containing 257 g/l of $NiSO_4 \cdot 7H_2O$, 45 g/l of $NiCl_2 \cdot 6H_2O$ and 30 g/l of $H_3BO_3$. Herein, the concentration of Ni in the electrolyte solution is preferably at least 5 g/l, and more preferably at least 8 g/l. Moreover, the concentration of Ni in the electrolyte solution is preferably at most 100 g/l. In the case where the concentration of Ni in the electrolyte solution is less than 5 g/l, the electrolysis efficiency tends to be lowered, and in the case where it exceeds over 100 g/l, the concentration of the solution of Ni exceeds over the saturated concentration to generate fine particles to be suspended.

In the present invention, the shape of a metal nanotube can be controlled by adjusting at least one of the conditions selected from the pH of the electrolyte solution used in the electrolysis and the applied voltage in the electrolysis. Herein, the shape of a metal nanotube is referred to the wall thickness and the aspect ratio of a metal nanotube.

In order to obtain a metal nanotube by the apparatus and the manufacturing process of the present invention, the pH of the electrolyte solution used in the electrolysis is preferably adjusted to be 0 to 5.5, and more preferably 1 to 2. In the case where the pH is less than 0, the current efficiency tends to be significantly lowered, and in the case where the pH exceeds over 5.5, a metal nanowire tends to be produced. It is assumed that it is because the concentration of a proton ($H^+$) in the solution is lowered, then the amount of generated hydrogen gas ($H_2$) by the electrode reaction is reduced and the amount of $H_2$ passing through the penetrated hole 4a is also reduced, and as a result, the penetrated hole 4a is blocked by precipitation of metal. At this time, it is preferable that the voltage (the electrolytic voltage) applied between the cathode 2 and the anode 6 in the electrolysis is made a direct current voltage from the viewpoint of the electrolysis time for forming a nanotube and the viewpoint that the highly pressurized bubble portion Z can be formed and maintained at and nearby the pinhole as described above by $H_2$ generated on the cathode 2. As for the pulsation operation, in order to control generation of a nucleus and the growth process of precipitating metal, it is necessary to previously design the most suitable conditions of a pulse waveform (scheduling) from the viewpoint of the ionic transfer speed of $Ni^{2+}$ and $H^+$, respectively.

The voltage applied between the cathode 2 and the anode 6 is preferably a direct voltage of −0.5 to −1.5 V, and more preferable a direct voltage of −0.7 to −1.0 V. In the case where the applied voltage is less than −1.5 V, the inner surface of a nanotube tends to become significantly rough by precipitation of metal, and in the case where it exceeds over −0.5 V, since the reduction reaction on the cathode 2 becomes mild, the amount of Ni precipitated and the amount hydrogen gas generated are lowered, and there is the tendency that a long period of time is required for forming a metal nanotube or that a nanotube can not be obtained.

It should be noted that by adjusting the conditions in the electrolysis to the above-described values of an electrolytic voltage and pH of a solution, generation of hydrogen gas and precipitation of Ni can take balance, and a metal nanotube can be formed. In the case where the pH of the electrolyte solution is high and the electrolytic voltage is large, there is the tendency that a metal nanotube is not obtained and a metal nanowire is easily obtained since the hole of the tube is blocked.

A metal nanotube is obtained by immersing the film on which the metal is precipitated by the above operation in a solvent and then removing the film 4 having the penetrated hole 4a. A solution for immersing the film on which the metal is precipitated is not particularly limited, and a solution suitable for dissolving the film 4 having the penetrated hole 4a can be appropriately selected.

According to the process for manufacturing a metal nanotube of the present invention, although depending on the electrolytic conditions, the wall thickness of the metal tube, the thickness of the porous film and the size of the penetrated hole, a metal nanotube can be formed in a short time such as 200 to 400 seconds.

A metal nanotube obtained by the present invention comprises, for example, transition metals such as Ni, Fe, Co, Pt, Pd, Rh, Ru and the like or an alloy thereof, and the diameter of a metal nanotube is about 100 to 200 nm, the length is about 6 to 10 μm, the aspect ratio is about 50 to 60 and the wall thickness is about 1 to 70 nm.

The shape of the metal nanotube obtained in the present invention can be controlled by changing the concentration and the pH of the electrolyte solution and the electrolytic voltage. It is preferable that the pH of the electrolyte solution is 0 to 5.5 and the applied voltage in the electrolysis is −0.5 to −1.5 V, for example in the case where a porous film in which the diameter of the penetrated hole is 200 nm is used, when the applied voltage is set at −0.7 V, a metal nanotube having a wall thickness of 20 to 30 nm can be obtained under the condition of pH 1.5, and a metal nanotube having a wall thickness of 20 to 30 nm can be obtained when pH is 3.4. Moreover, in the case where the pH is 5.5, a metal nanotube having a wall thickness of 50 to 70 nm is obtained. Furthermore, in the case where the applied voltage is set at −1.0 V and a solution of pH 1.5 is used, a metal nanotube having a wall thickness of 10 nm can be obtained.

These metal nanotubes can be utilized in a variety of fields, for example, needless to say, in the fields of microelectronics and MEMS (Micro Electro Mechanical System) and in the energy fields such as photovoltaic generation and micro-fuel electric cell. For example, the metal nanotube obtained by the present invention can be also utilized as a catalyst as well as can be utilized as an electron discharging material, hydrogen storage material or a wiring material. Moreover, it can be utilized as a magnetic material in a magnetic memory medium, magnetic memory element and the like as well as can be used as a nanoreactor.

Hereinafter, the present invention is explained with reference to Examples; however, the present invention is not limited thereto.

Figure 4:
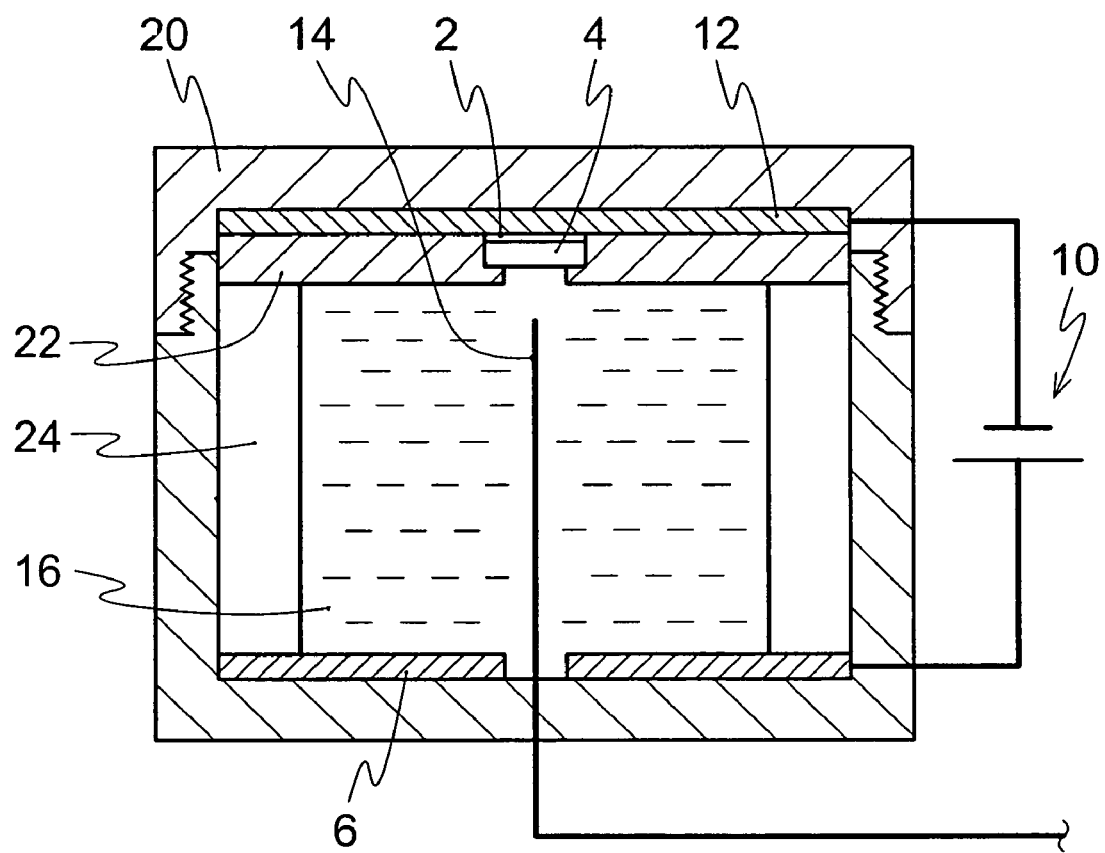
FIG. 4 is a cross sectional view showing the three electrodes cell which was used in Example.

A metal nanotube was manufactured by utilizing the three-electrode cell shown in FIG. 4.

Example 1

As shown in Table 1, a polycarbonate film with a thickness of 6 μm and having $4 \times 10^8$ pieces per 1 cm$^2$ of penetrated holes having a hole diameter of 100 nm was used as a porous film 4.

A film having a thickness of 30 nm comprising a platinum-palladium alloy was formed as a cathode 2 on one surface of this porous film 4 by sputtering. Even after the cathode 2 was formed, the penetrated holes of the porous film were not blocked.

An anode 6 in a shape of a circular disc plate-comprising Ni was disposed within a container 20 in a cylindrical shape, and a supporting ring 22 was mounted via a spacer 24 in a cylindrical shape, and then, an aqueous solution containing 280 g/l of NiSO$_4$.7H$_2$O, 45 g/l of NiCl$_2$.6H$_2$O and 38 g/l of H$_3$BO$_3$ ([Ni$^{2+}$]=1.16 M) was injected as an electrolyte solution 16. The pH of the solution was 1.5.

Next, the porous film 4 was disposed at a notch provided nearby the center of the supporting ring 22, and a current collector 12 in a shape of a circular disc plate comprising Pt was disposed on the porous film 4 so that it is brought into contact with the cathode 2, and then the container 20 was sealed.

It should be noted that by appropriately selecting the sizes of the spacer 24 and the supporting ring 22, it was made so that the distance between the cathode 2 and the anode 6 becomes 10 mm. Moreover, it was made so that a reference electrode 14 can be inserted by providing a hole at the center portion of the anode 6. A Ni reference electrode was used for the reference electrode 14.

The three-electrode cell assembled in this way was set in the direction shown in FIG. 4 that the cathode 2 is located at an upper position and the anode 6 is located at a lower position and a nanotube was manufactured by applying a voltage of −0.7 V between the cathode 2 and the anode 6. The time for applying the voltage was 2000 seconds.

Figure 5:
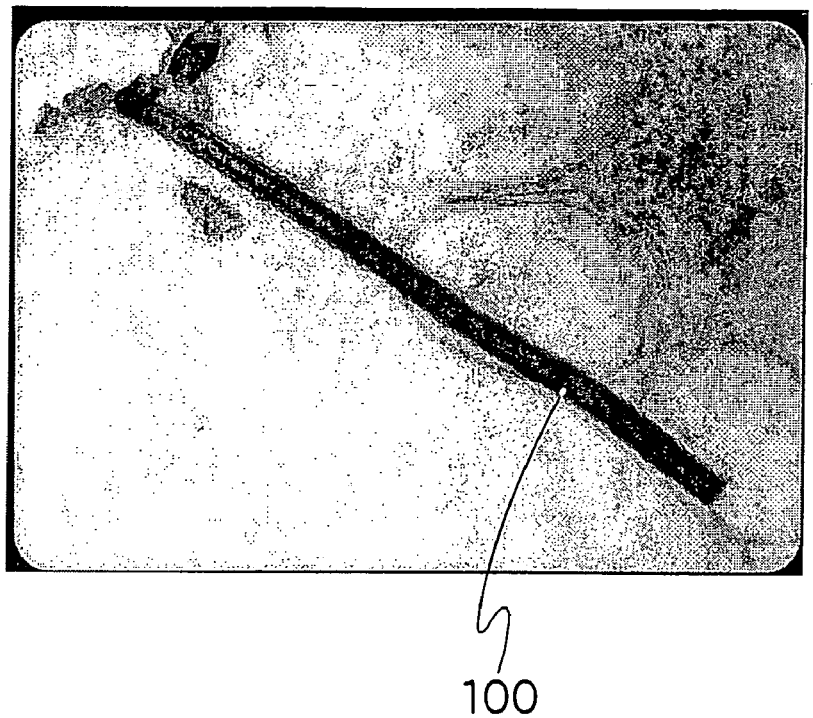
FIG. 5 is a TEM image of the metal nanotube manufactured according to the present invention.

The porous film 4 was taken out from the three-electrode cell and immersed into dichloromethane to dissolve and remove polycarbonate, and then, a large number of metal nanotubes having a diameter of 100 nm, a length of 6 μm and a wall thickness of 20 nm were obtained. The TEM image of the obtained metal nanotube is shown in FIG. 5.

Example 2

As shown in Table 1, a three-electrode cell was assembled in the same manner as Example 1. The assembled three-electrode cell was turned upside down and set contrary to the case of FIG. 4 so that the cathode 2 is located at a lower position and the anode 6 is located at an upper position, and a nanotube was manufactured by applying a voltage of −0.7 V for 1200 seconds between the cathode 2 and the anode 6.

The porous film 4 was taken out from the three-electrode cell and immersed into dichloromethane to dissolve and remove polycarbonate, and then, metal nanotubes having a diameter of 100 nm and a length of 6 μm were obtained, however, a considerable number of metal nanowires were also obtained.

Example 3

As shown in Table 1, a three-electrode cell was assembled in the same manner as Example 1. The assembled three-electrode cell was disposed so that the cathode 2 and the anode 6 were parallel to the direction of gravity, and a nanotube was manufactured by applying a voltage of −0.7 V for 1200 seconds between the cathode 2 and the anode 6.

The porous film 4 was taken out from the three-electrode cell and immersed into dichloromethane to dissolve and remove polycarbonate, then, a large number of metal nanotubes having a diameter of 100 nm, a length of 6 μm and a wall thickness of 20 nm were obtained.

Example 4

As shown in Table 1, as a porous film 4, a polycarbonate film with a thickness of 10 μm which has $3 \times 10^8$ pieces per 1 $cm^2$ of penetrated holes having a hole diameter of 200 nm was used.

On one surface of this porous film 4, a film having a thickness of 30 nm comprising a platinum-palladium alloy was formed as a cathode 2.

An anode 6 in a shape of a circular disc plate comprising Ni was disposed within a container 20 in a cylinderical shape, and a supporting ring 22 was mounted via a spacer 24 in a cylindrical shape, and further, an aqueous solution containing 280 g/l of $NiSO_4 \cdot 7H_2O$, 45 g/l of $NiCl_2 \cdot 6H_2O$ and 38 g/l of $H_3BO_3$ was injected as a electrolytic solution 16.

Next, the porous film 4 was disposed at a notch provided nearby the center of the supporting ring 22 and a current collector 12 in a shape of a circular disc plate comprising Pt was disposed on the porous film 4 so as to be brought into contact with the cathode 2, and then the container 20 was sealed.

It should be noted that the sizes of the spacer 24 and the supporting ring 22 were appropriately selected so that the distance between the cathode 2 and the anode 6 becomes 10 mm. Moreover, a hole was provided at the center portion of the anode 6 so that a reference electrode 14 can be inserted therein.

The three-electrode cell assembled in this way was set in the direction shown in FIG. 4 that the cathode 2 is located at an upper position and the anode 6 is located at a lower position, and a nanotube was manufactured by applying a voltage of –0.7 V for 6000 seconds between the cathode 2 and the anode 6.

Figure 6:
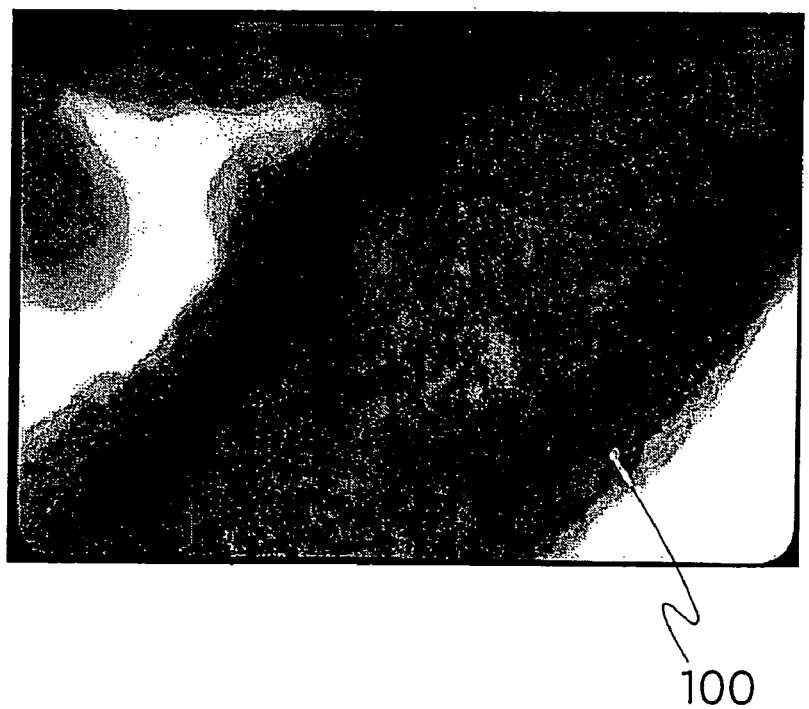
FIG. 6 is a TEM image of the metal nanotube manufactured according to the present invention.

The porous film 4 was taken out from the three-electrode cell and immersed into dichloromethane to dissolve and remove polycarbonate, and then, a large number of metal nanotubes having a diameter of 200 nm, a length of 10 μm and a wall thickness of 20 nm were obtained. The TEM image of the obtained metal nanotube is shown in FIG. 6.

Example 5

As shown in Table 1, a three-electrode cell was assembled in the same manner as Example 4. The assembled three-electrode cell was turned upside down and set contrary to the case of FIG. 4 so that the cathode 2 is located at a lower position and the anode 6 is located at an upper position, and a nanotube was manufactured by applying a voltage of –0.7 V for 2000 seconds between the cathode 2 and the anode 6.

The porous film 4 was taken out from the three-electrode cell and immersed into dichloromethane to dissolve and remove polycarbonate, and then, a large number of metal nanotubes having a diameter of 200 nm, a length of 10 μm and a wall thickness of 20 nm were obtained.

Example 6

As shown in Table 1, a three-electrode cell was assembled in the same manner as Example 4. The assembled three-electrode cell was disposed so that the cathode 2 and the anode 6 are parallel to the direction of gravity, and a nanotube was manufactured by applying a voltage of –0.7 V for 2000 seconds between the cathode 2 and the anode 6.

The porous film 4 was taken out from the three-electrode cell and immersed in dichloromethane to dissolve and remove polycarbonate, and then, a large number of metal nanotubes having a diameter of 200 nm, a length of 10 μm and a wall thickness of 20 nm were obtained.

TABLE 1

| | Ex. 1 | Ex. 2 | Ex. 3 | Ex. 4 | Ex. 5 | Ex. 6 |
|---|---|---|---|---|---|---|
| Porous film | | | | | | |
| Material | Polycarbonate | ← | ← | ← | ← | ← |
| Thickness (μm) | 6 | ← | ← | 10 | ← | ← |
| Hole diameter (nm) | 100 | ← | ← | 200 | ← | ← |
| Number of holes (pieces/$cm^2$) | $4 \times 10^8$ | ← | ← | $3 \times 10^8$ | ← | ← |
| Cathode | | | | | | |
| Material | Pt-Pd | ← | ← | ← | ← | ← |
| Thickness (nm) | 30 | ← | ← | ← | ← | ← |
| Process for forming | Sputtering | ← | ← | ← | ← | ← |
| Anode | | | | | | |
| Material | Ni | ← | ← | ← | ← | ← |
| Electrolyte solution | 280 g/l $NiSO_4 \cdot 7H_2O$ | ← | ← | ← | ← | ← |
| | 45 g/l $NiCl_2 \cdot 6H_2O$ | ← | ← | ← | ← | ← |
| | 38 g/l $H_3BO_3$ | ← | ← | ← | ← | ← |
| Direction of three-electrode cell* | C/A | A/C | Ver | C/A | A/C | Ver |
| Applied voltage (V) | –0.7 | ← | ← | ← | ← | ← |
| Time for applying voltage (s) | 2000 | 1200 | 1200 | 6000 | 2000 | 2000 |
| Obtained nanotube | | | | | | |
| Outer diameter (nm) | 100 | 100 | 100 | 200 | 200 | 200 |
| Length (μm) | 6 | 6 | 6 | 10 | 10 | 10 |
| Wall thickness (nm) | 20 | 20 | 20 | 20 | 20 | 20 |
| Aspect ratio | 60 | 60 | 60 | 50 | 50 | 50 |

*C/A: The cathode is located at an upper position, and the anode is located at a lower position.
A/C: The anode is located at an upper position, and the cathode is located at a lower position.
Ver: The cathode and the anode are vertical with respect to horizontal surface (parallel to the direction of gravity).

Example 7

An electrolysis was carried out under the same conditions as Example 1, except that the applied voltage was −1.0 V, and a large number of metal nanotubes as shown in Table 2 were obtained. At this time, the time for applying the voltage was 300 seconds.

Example 8

An electrolysis was carried out under the same conditions as Example 2, except that the applied voltage was −1.0 V, and a large number of metal nanotubes as shown in Table 2 were obtained. At this time, the time for applying the voltage was 300 seconds.

Example 9

An electrolysis was carried out under the same conditions as Example 3, except that the applied voltage was −1.0 V, and a large number of metal nanotubes as shown in Table 2 were obtained. At this time, the time for applying the voltage was 300 seconds.

Example 10

An electrolysis was carried out under the same conditions as Example 4, except that the applied voltage was −1.0 V, and a large number of metal nanotubes as shown in Table 2 were obtained. At this time, the time for applying the voltage was 300 seconds.

Example 11

An electrolysis was carried out under the same conditions as Example 5, except that the applied voltage was −1.0 V, and a large number of metal nanotubes as shown in Table 2 were obtained. At this time, the time for applying the voltage was 300 seconds.

Example 12

An electrolysis was carried out under the same conditions as Example 6, except that the applied voltage was −1.0 V, and a large number of metal nanotubes as shown in Table 2 were obtained. At this time, the time for applying the voltage was 300 seconds.

The electrolytic conditions and the obtained metal nanotubes in Examples 7 to 12 are shown in Table 2. It is revealed from Table 2 that a metal nanotube is obtained more efficiently in a shorter time by the apparatus for manufacturing a metal nanotube and the process for manufacturing the same of the present invention, compared with the conventional manufacturing process.

TABLE 2

|  | Ex. 7 | Ex. 8 | Ex. 9 | Ex. 10 | Ex. 11 | Ex. 12 |
| --- | --- | --- | --- | --- | --- | --- |
| Porous film |  |  |  |  |  |  |
| Material | Polycarbonate | ← | ← | ← | ← | ← |
| Thickness (μm) | 6 | ← | ← | 10 | ← | ← |
| Hole diameter (nm) | 100 | ← | ← | 200 | ← | ← |
| Number of holes (pieces/cm$^2$) | $4 \times 10^8$ | ← | ← | $3 \times 10^8$ | ← | ← |
| Cathode |  |  |  |  |  |  |
| Material | Pt-Pd | ← | ← | ← | ← | ← |
| Thickness (nm) | 30 | ← | ← | ← | ← | ← |
| Process for forming | Sputtering | ← | ← | ← | ← | ← |
| Anode |  |  |  |  |  |  |
| Material | Ni | ← | ← | ← | ← | ← |
| Electrolyte solution | 280 g/l NiSO$_4$ · 7H$_2$O | ← | ← | ← | ← | ← |
|  | 45 g/l NiCl$_2$ · 6H$_2$O | ← | ← | ← | ← | ← |
|  | 38 g/l H$_3$BO$_3$ | ← | ← | ← | ← | ← |
| Direction of three-electrode cell* | C/A | A/C | Ver | C/A | A/C | Ver |
| Applied voltage (V) | −1.0 | ← | ← | ← | ← | ← |
| Time for applying voltage (s) | 300 | 300 | 300 | 300 | 300 | 300 |
| Obtained nanotube |  |  |  |  |  |  |
| Outer diameter (nm) | 100 | 100 | 100 | 200 | 200 | 200 |
| Length (μm) | 6 | 6 | 6 | 10 | 10 | 10 |
| Wall thickness (nm) | 10 | 10 | 10 | 10 | 10 | 10 |
| Aspect ratio | 60 | 60 | 60 | 50 | 50 | 50 |

*C/A: The cathode is located at an upper position, and the anode is located at a lower position.

A/C: The anode is located at an upper position, and the cathode is located at a lower position.

Ver: The cathode and the anode are vertical with respect to horizontal surface (parallel to the direction of gravity).

Example 13

An electrolysis was carried out under the same conditions as Example 4, except that the pH of the solution used for the electrolysis was 3.4, and a large number of metal nanotubes as shown in Table 3 were obtained. At this time, the time for applying a voltage was 300 seconds.

Example 14

An electrolysis was carried out under the same conditions as Example 4, except that the pH of the solution used for the electrolysis was 5.5, and a large number of metal nanotubes as shown in Table 3 were obtained. At this time, the time for applying a voltage was 300 seconds.

TABLE 3

|  | Ex. 13 | Ex. 14 |
|---|---|---|
| Porous film |  |  |
| Material | Polycarbonate | ← |
| Thickness (μm) | 10 | ← |
| Hole diameter (nm) | 200 | ← |
| Number of holes (pieces/cm$^2$) | 3 × 10$^8$ | ← |
| Cathode |  |  |
| Material | Pt—Pd | ← |
| Thickness (nm) | 30 | ← |
| Process for forming | Sputtering | ← |
| Anode |  |  |
| Material | Ni | ← |
| Electrolyte solution | 280 g/l NiSO$_4$•7H$_2$O | ← |
|  | 45 g/l NiCl$_2$•6H$_2$O | ← |
|  | 38 g/l H$_3$BO$_3$ | ← |
| Direction of three-electrode cell* | C/A | ← |
| Applied voltage (V) | −0.7 | ← |
| Time for applying voltage (s) | 300 | 300 |
| Obtained nanotube |  |  |
| Outer diameter (nm) | 200 | 200 |
| Length (μm) | 10 | 10 |
| Wall thickness (nm) | 20 | 20 |
| Aspect ratio | 50 | 50 |

*C/A: The cathode is located at an upper position, and the anode is located at a lower position.
A/C: The anode is located at an upper position, and the cathode is located at a lower position.
Ver: The cathode and the anode are vertical with respect to horizontal surface (parallel to the direction of gravity).

INDUSTRIAL APPLICABILITY

According to the present invention, a metal nanotube comprising Ni, Pt, Pd, Rh, Ru, Co, Fe and an alloy thereof, or alloy based metal of such as Ni:Zn and the like can be easily and cheaply manufactured by a general electrochemical process.

Moreover, according to the present invention, a thin metal film which is a cathode is exposed in a circular shape at the bottom of the penetrated hole, therefrom a metal nanotube is formed satisfactorily. Further, since hydrogen gas is generated and retained nearby the bottom of the penetrated hole, a metal nanotube grows well along the penetrated hole and a metal nanotube having a small diameter and a long length, that is, having a high aspect ratio which is advantageous to industrial uses can be manufactured.

The invention claimed is:

1. A process for manufacturing a metal nanotube comprising:
    a step for providing a film having a penetrated hole;
    a step for forming a cathode having a thickness of 10 to 80 nm and a pinhole on one surface of the film, wherein the pinhole is formed on the penetrated hole, and the cathode is exposed on the bottom of the penetrated hole;
    a step for contacting the surface of the cathode with a container disposed over and blocking the bottom of the penetrated hole;
    a step for filling an electrolyte solution containing metal ions between the cathode and an anode;
    a step for applying a voltage to the electrolyte solution to electrochemically precipitate a metal on the inner surface of the penetrated hole and generate gas in the pinhole and the penetrated hole; and
    a step for immersing the film in a solvent to remove the film, to give a metal nanotube.

2. The process for manufacturing a metal nanotube of claim 1, wherein said cathode comprises gold, copper, a gold based alloy, a copper based alloy or a platinum-palladium alloy.

3. The process for manufacturing a metal nanotube of claim 1, wherein the shape of said metal nanotube is controlled by adjusting at least one condition selected from the pH of said electrolyte solution and the applied voltage in said electrolysis.

4. The process for manufacturing a metal nanotube of claim 3, wherein the pH of said electrolyte solution containing metal is 0 to 5.5 and the applied voltage in said electrolysis is −0.5 to −1.5 V.

5. The process for manufacturing a metal nanotube of claim 1, wherein said container includes a current collector in contact with the cathode over the bottom of the penetrated hole.

* * * * *